(12) United States Patent
Burns et al.

(10) Patent No.: US 10,896,078 B1
(45) Date of Patent: Jan. 19, 2021

(54) METHOD AND SYSTEM FOR IMPLEMENTING A MULTI-PLATFORM FRAMEWORK FOR SHARED SERVICES

(71) Applicant: JPMorgan Chase Bank, N.A., New York, NY (US)

(72) Inventors: Kevin Burns, Tampa, FL (US); Lamour G. Roberts, Apollo Beach, FL (US); Richard Bernstein, Boca Raton, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/520,840

(22) Filed: Jul. 24, 2019

(51) Int. Cl.
  *G06F 9/54* (2006.01)
  *G06F 9/50* (2006.01)
  *G06F 9/455* (2018.01)

(52) U.S. Cl.
  CPC .......... *G06F 9/546* (2013.01); *G06F 9/45529* (2013.01); *G06F 9/5072* (2013.01)

(58) Field of Classification Search
  None
  See application file for complete search history.

(56) References Cited

U.S. PATENT DOCUMENTS

2003/0233376 A1* 5/2003 Bussler
2012/0221738 A1* 8/2012 Schroeder, Jr.

* cited by examiner

*Primary Examiner* — Syed A Roni
(74) *Attorney, Agent, or Firm* — Greenblum & Bernstein, P.L.C.

(57) ABSTRACT

A method for integrating an application with a platform is provided. The method includes: receiving, from the application, a request message and at least one configuration file; extracting, from the request message, a first set of raw data; using information included in the configuration file to transform the extracted raw data into a target format and to persist the extracted raw data into a database; mapping a subset of the extracted raw data to a predetermined canonical object; and outputting the transformed data to a predetermined destination that is associated with the platform.

19 Claims, 11 Drawing Sheets

METHOD AND SYSTEM FOR IMPLEMENTING A MULTI-PLATFORM FRAMEWORK FOR SHARED SERVICES

BACKGROUND

1. Field of the Disclosure

This technology generally relates to methods and systems for facilitating integration of applications with distributed platforms and external services in a modular and reusable manner.

2. Background Information

Business technical solutions, such as software applications that are stored on a server, are often shared across multiple platforms. When operating on multiple platforms, business logic that is tightly coupled with a specific technical implementation may have an adverse impact on the efficiency with which modifications to existing products and new products may be developed in accordance with the business logic.

In addition, accessibility and usability of application programs must be maintained, even when disparate data sources are involved. The maintaining of accessibility and usability may be especially challenging when the business solutions are provided by legacy software systems that were designed for relatively old technology platforms. Upgrading the underlying technology may also require modifications to the business logic and/or regression testing, thereby further limiting flexibility with respect to delivering updated products.

Accordingly, there is a need to provide a reusable framework that is configured to decouple business logic from its technical implementation such that technical modules may be upgraded or modified without impacting the business logic.

SUMMARY

The present disclosure, through one or more of its various aspects, embodiments, and/or specific features or sub-components, provides, inter alia, various systems, servers, devices, methods, media, programs, and platforms for facilitating integration of applications with distributed platforms and external services in a modular and reusable manner.

According to an aspect of the present disclosure, a method for integrating an application with a platform is provided. The method is implemented by at least one processor. The method includes: receiving, from the application, a request message and at least one a configuration file; extracting, from the request message, a first set of raw data; using information included in the at least one configuration file to transform the extracted raw data into a target format; mapping a subset of the extracted raw data to a predetermined canonical object; and outputting the transformed data to a predetermined destination that is associated with the platform. The method may further include persisting the extracted raw data into a database.

The target format may include at least one from among eXtensible Markup Language (XML) format, Java format, Java Script Object Notation (JSON) format, Java HashMaps format, Google Protocol Buffers format, Fixed Length Extended Binary Coded Decimal Interchange Code (EBCDIC) format, and American Standard Code for Information Interchange (ASCII) format.

The received request message may relate to at least one protocol from among an MQ protocol, a Hypertext Transfer Protocol Secure (HTTPS) protocol, a WebSphere Optimized Local Adapters (WOLA) protocol, a Kafka protocol, a Secure File Transfer Protocol (SFTP) protocol, and an Advanced Message Processing System (AMPS) protocol.

The method may further include lazy-loading the at least one configuration file when a command for loading the at least one configuration file is received from a user.

The method may further include caching the at least one configuration file.

The method may further include using an integration framework component to execute a software module that relates to the application.

The method may further include logging at least one event that occurs during an execution of the method.

The method may further include performing at least one utility function from among a string manipulation function, a calendar utility function, and a null check function.

The receiving of the request message may be performed by using a communication interface to receive the request message. The communication interface may include an application programming interface (API) that is displayable to a user.

The outputting of the transformed data may be performed by using the communication interface to output the transformed data.

According to another aspect of the present disclosure, a computing apparatus configured to implement an execution of a method for integrating an application with a platform is provided. The computing apparatus includes a first component that includes a first processor, a second component that includes a second processor, a third component that includes a third processor, and a memory. The first processor is configured to: receive, from the application, a request message and at least one configuration file; extract, from the request message, a first set of raw data; map a subset of the extracted raw data to a predetermined canonical object; and persist the extracted raw data to the memory. The second processor is configured to use information included in the configuration file to transform the extracted raw data into a target format. The third processor is configured to persist the transformed data into the memory and to output the transformed data to a predetermined destination that is associated with the platform.

The target format may include at least one from among eXtensible Markup Language (XML) format, Java format, Java Script Object Notation (JSON) format, Java HashMaps format, Google Protocol Buffers format, Fixed Length Extended Binary Coded Decimal Interchange Code (EBCDIC) format, and American Standard Code for Information Interchange (ASCII) format.

The received request message may relate to at least one protocol from among an MQ protocol, a Hypertext Transfer Protocol Secure (HTTPS) protocol, a WebSphere Optimized Local Adapters (WOLA) protocol, a Kafka protocol, a Secure File Transfer Protocol (SFTP) protocol, and an Advanced Message Processing System (AMPS) protocol.

The computing apparatus may further include a fourth component that includes a fourth processor configured to lazy-load the at least one configuration file when a command for loading the at least one configuration file is received from a user.

The fourth processor may be further configured to cache the at least one configuration file.

The fourth processor may be further configured to use an integration framework component to execute a software module that relates to the application.

The fourth processor may be further configured to log at least one event that occurs during an execution of the method.

The fourth processor may be further configured to perform at least one utility function from among a string manipulation function, a calendar utility function, and a null check function.

The first processor may be further configured to use a communication interface to receive the request message via a data access layer. The communication interface may include an application programming interface (API) that is displayable to a user.

The third processor may be further configured to use the communication interface to output the transformed data.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
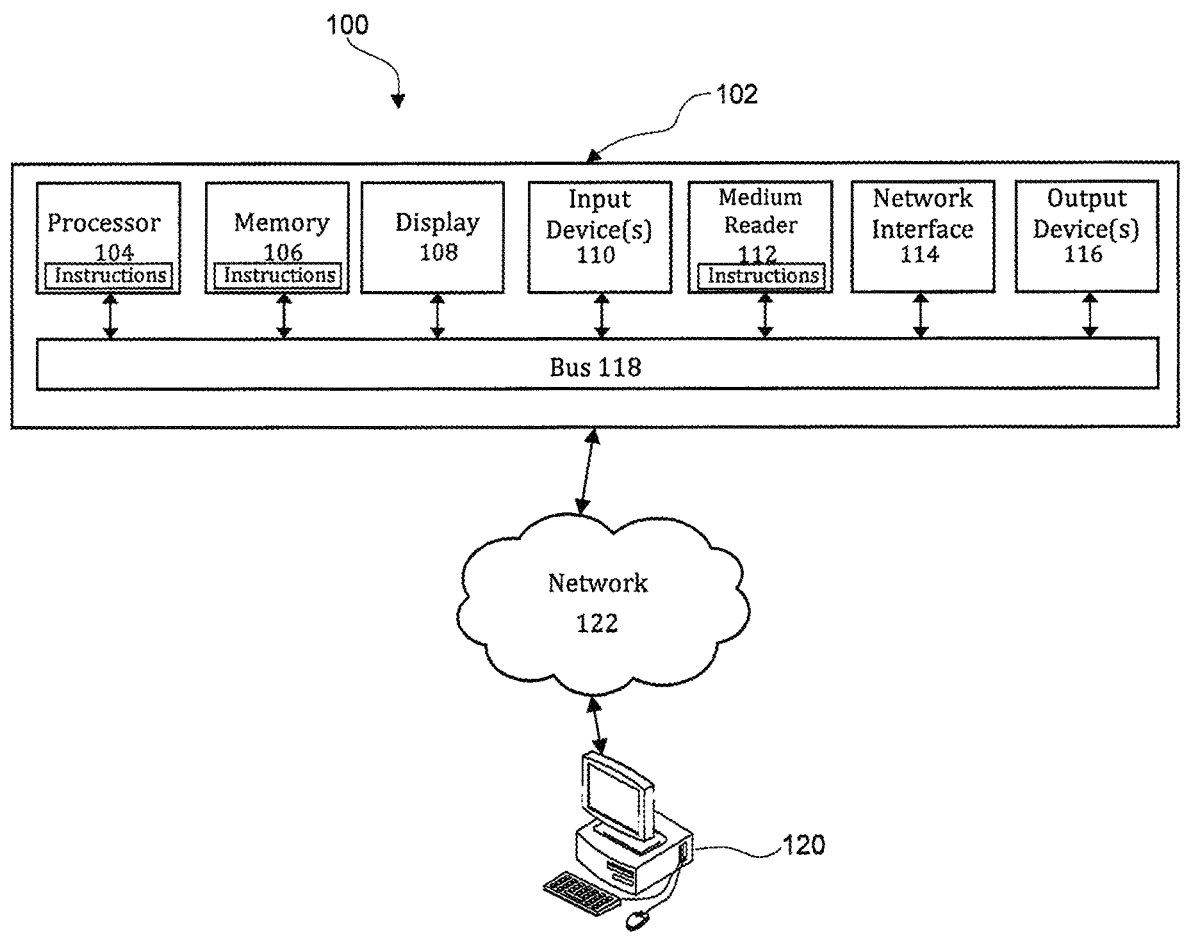
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other, forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a, single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for facilitating integration of applications with distributed platforms and external services in a modular and reusable manner.

Figure 2:
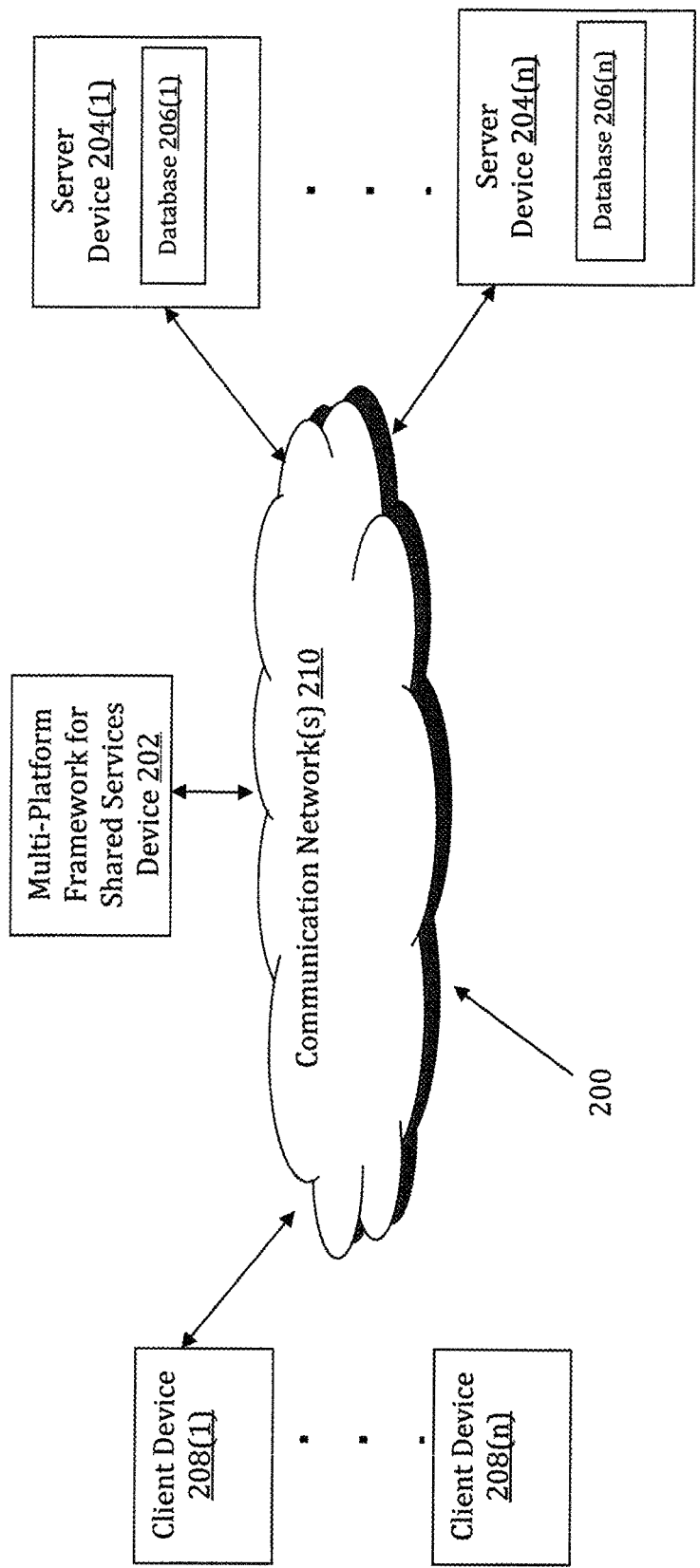
FIG. 2 illustrates an exemplary diagram of a network environment.

Referring to FIG. 2, a schematic of an exemplary network environment 200 for implementing a method for facilitating integration of applications with distributed platforms and external services in a modular and reusable manner is illustrated. In an exemplary embodiment, the method is executable on any networked computer platform, such as, for example, a personal computer (PC).

The method for facilitating integration of applications with distributed platforms and external services in a modular and reusable manner may be implemented by a Multi-Platform Framework for Shared Services (MFSS) device 202. The MFSS device 202 may be the same or similar to the computer system 102 as described with respect to FIG. 1. The MFSS device 202 may store one or more applications that can include executable instructions that, when executed by the MFSS device 202, cause the MFSS device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MFSS device 202 itself, may be located in virtual server(s) running in a cloud-based computing environment rather than being tied to one or more specific physical network computing devices. Also, the application(s) may be running in one or more virtual machines (VMs) executing on the MFSS device 202. Additionally, in one or more embodiments of this technology, virtual machine(s) running on the MFSS device 202 may be managed or supervised by a hypervisor.

In the network environment 200 of FIG. 2, the MFSS device 202 is coupled to a plurality of server devices 204(1)-204(n) that hosts a plurality of databases 206(1)-206(n), and also to a plurality of client devices 208(1)-208(n) via communication network(s) 210. A communication interface of the MFSS device 202, such as the network interface 114 of the computer system 102 of FIG. 1, operatively couples and communicates between the MFSS device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MFSS device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and MFSS devices that efficiently implement a method for facilitating integration of applications with distributed platforms and external services in a modular and reusable manner.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MFSS device 202 may be a standalone device or integrated with one or more other devices or apparatuses, such as one or more of the server devices 204(1)-204(n), for example. In one particular example, the MFSS device 202 may include or be hosted by one of the server devices 204(1)-204(n), and other arrangements are also possible. Moreover, one or more of the devices of the MFSS device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the MFSS device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store configuration file information, raw data received from an application, and processed data that has been transformed into a target format based on information provided in a configuration file.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the MFSS device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface application, such as standard web browsers or standalone client applications, which may provide an interface to communicate with the MFSS device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the MFSS device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MFSS device 202, the server devices 204(1)-204(n), or the client devices 208(1)-208(n), for example, may be configured to operate as virtual instances on the same physical machine. In other words, one or more of the MFSS device 202, the server devices 204(1)-204(n), or the client devices 208(1)-208(n) may operate on the same physical device rather than as separate devices communicating through communication network(s) 210. Additionally, there may be more or fewer MFSS devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
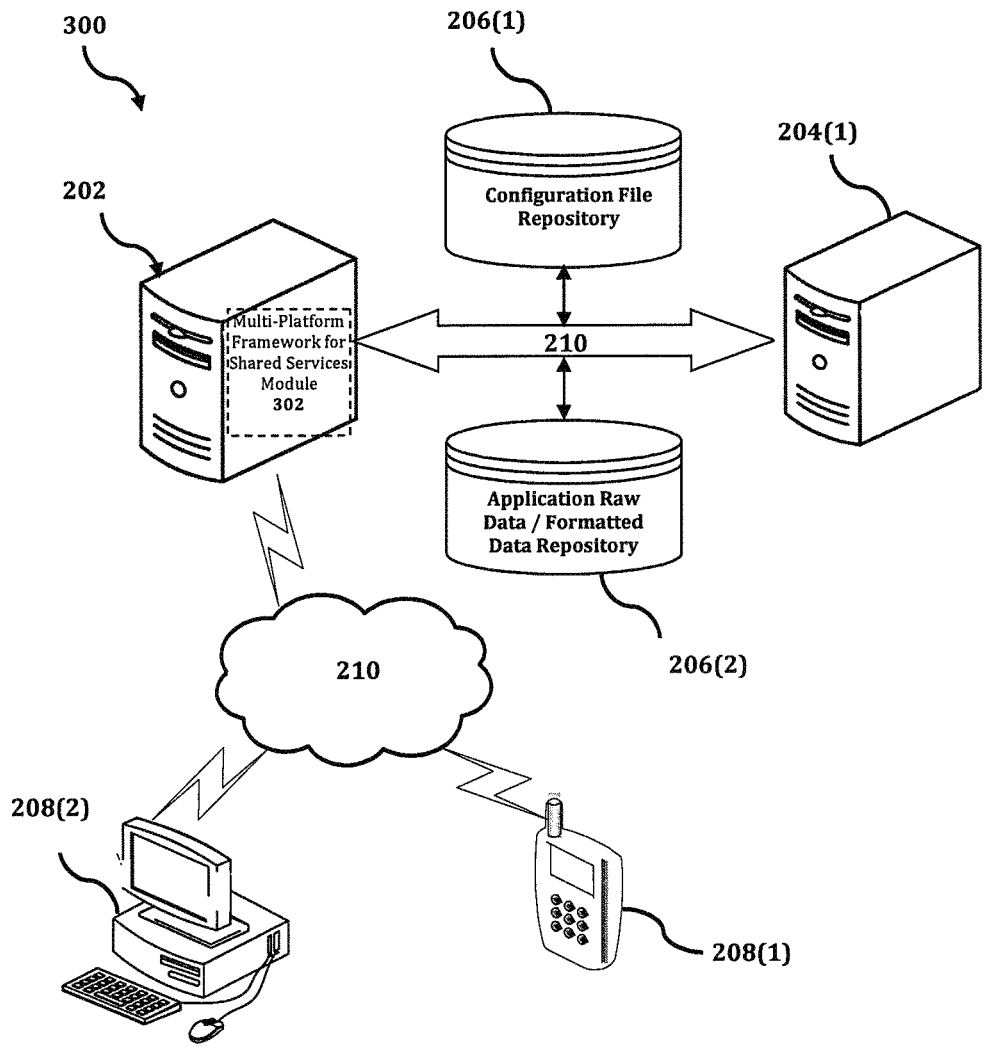
FIG. 3 shows an exemplary system for implementing a method for facilitating integration of applications with distributed platforms and external services in a modular and reusable manner.

The MFSS device 202 is described and shown in FIG. 3 as including a multi-platform framework for shared services module 302, although it may include other rules, policies, modules, databases, or applications, for example. As will be described below, the multi-platform framework for shared services module 302 is configured to implement a method for facilitating integration of applications with distributed platforms and external services in an automated, efficient, scalable, and reliable manner.

An exemplary process 300 for implementing a mechanism for facilitating integration of applications with distributed platforms and external services in a modular and reusable manner by utilizing the network environment of FIG. 2 is shown as being executed in FIG. 3. Specifically, a first client device 208(1) and a second client device 208(2) are illustrated as being in communication with MFSS device 202. In this regard, the first client device 208(1) and the second client device 208(2) may be "clients" of the MFSS device 202 and are described herein as such. Nevertheless, it is to be known and understood that the first client device 208(1) and/or the second client device 208(2) need not necessarily be "clients" of the MFSS device 202, or any entity described in association therewith herein. Any additional or alternative relationship may exist between either or both of the first client device 208(1) and the second client device 208(2) and the MFSS device 202, or no relationship may exist.

Further, MFSS device 202 is illustrated as being able to access a configuration file repository 206(1) and an application raw data/formatted data repository 206(2). The multi-platform framework for shared services module 302 may be configured to access these databases for implementing a method for facilitating integration of applications with distributed platforms and external services in a modular and reusable manner.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the MFSS device 202 via broadband or cellular communication. Of course, these embodiments are merely exemplary and are not limiting or exhaustive.

Upon being started, the multi-platform framework for shared services module 302 executes a process for facilitating integration of applications with distributed platforms and external services in a modular and reusable manner. An exemplary process for facilitating integration of applications with distributed platforms and external services in a modular and reusable manner is generally indicated at flowchart 400 in FIG. 4.

Figure 4:
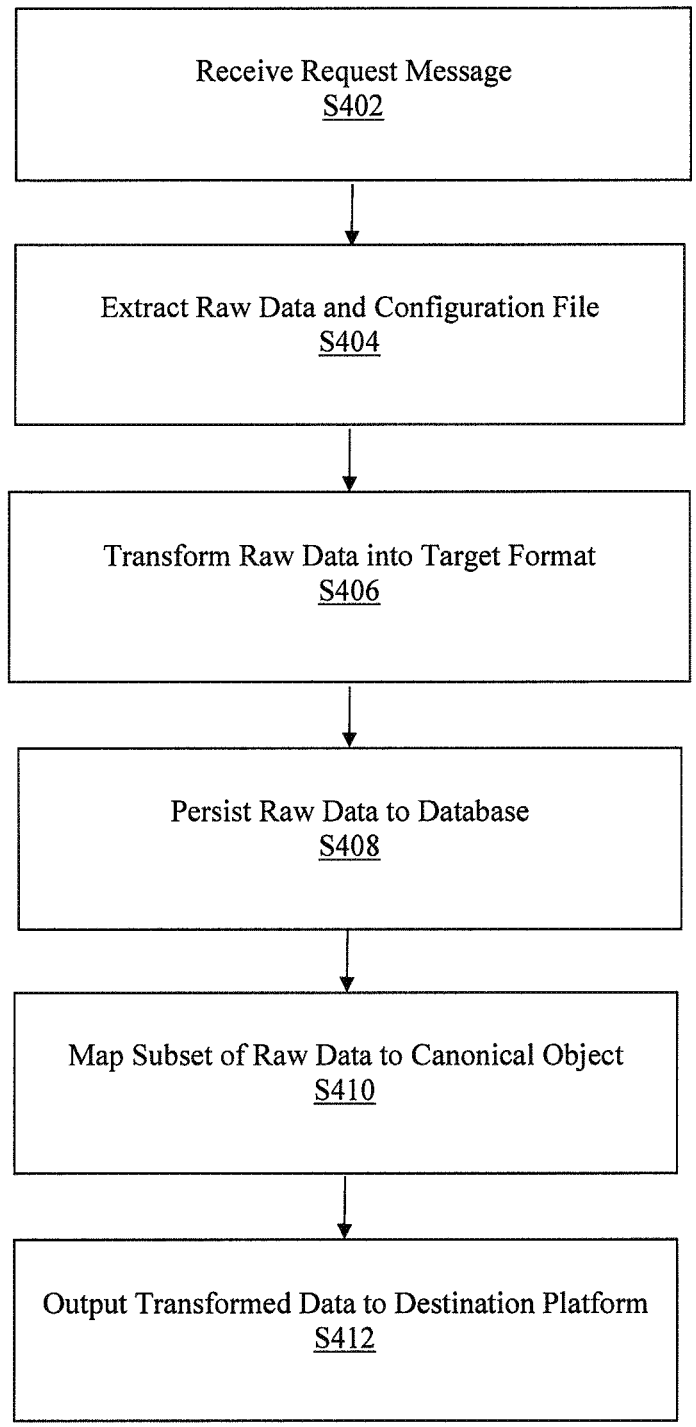
FIG. 4 is a flowchart of an exemplary process for implementing a method for facilitating integration of applications with distributed platforms and external services in a modular and reusable manner.

In the process 400 of FIG. 4, at step S402, a request message is received from an application for which an integration with a platform is sought. The request message includes raw data and is accompanied by at least one configuration file. In an exemplary embodiment, the request message is received together with a set of pre-configured configuration files. In an exemplary embodiment, the request message is received by a guard module that resides within a computing architecture. In an exemplary embodiment, the request message may be received via a communication interface that includes an application programming interface (API) that is displayable to a user.

At step S404, the configuration file(s) and the raw data are extracted from the request message. In an exemplary embodiment, the guard module is configured to extract the configuration file(s) and the raw data from the request message and to then forward the configuration file(s) and the data to a service core module for further processing. In an exemplary embodiment, the service core module is configured to perform various functions, such as, for example, lazy-loading the configuration file(s) in response to a received command for loading the configuration file(s); caching the configuration file(s); using an integration framework component to execute other software modules that relate to the application; log events; and perform utility functions, such as a string manipulation function, a calendar utility function, and a null check function.

At step S406, the raw data is transformed into a target format. In an exemplary embodiment, the transformation into the target format is based on information included in the configuration file and relates to the intended destination of the transformed data. In an exemplary embodiment, a source format of the raw data may relate to a source protocol, such as, for example, an MQ protocol, a Hypertext Transfer Protocol Secure (HTTPS) protocol, a WebSphere Optimized Local Adapters (WOLA) protocol, a Kafka protocol, a Secure File Transfer Protocol (SFTP) protocol, and an Advanced Message Processing System (AMPS) protocol. In an exemplary embodiment, the target format may include any one of eXtensible Markup Language (XML) format, Java format, Java Script Object Notation (JSON) format, Java HashMaps format, Google Protocol Buffers format, Fixed Length Extended Binary Coded Decimal Interchange Code (EBCDIC) format, and American Standard Code for Information Interchange (ASCII) format.

At step S408, the extracted raw data may be persisted to a database. In an exemplary embodiment, the extracted raw data is stored in the application raw data/formatted data repository 206(2). Then, at step S410, a subset of the extracted raw data is mapped to a standard canonical object. In an exemplary embodiment, the guard module uses information contained in the configuration file to persist the raw data into a predefined databased via the data access layer, and to map key data points to the standard canonical object.

At step S412, the transformed data is outputted to the intended destination. In an exemplary embodiment, the intended destination relates to a platform for which an integration of the application is being implemented. In an exemplary embodiment, the outputting of the transformed data is performed by an envoy module via the data access layer.

Figure 5:
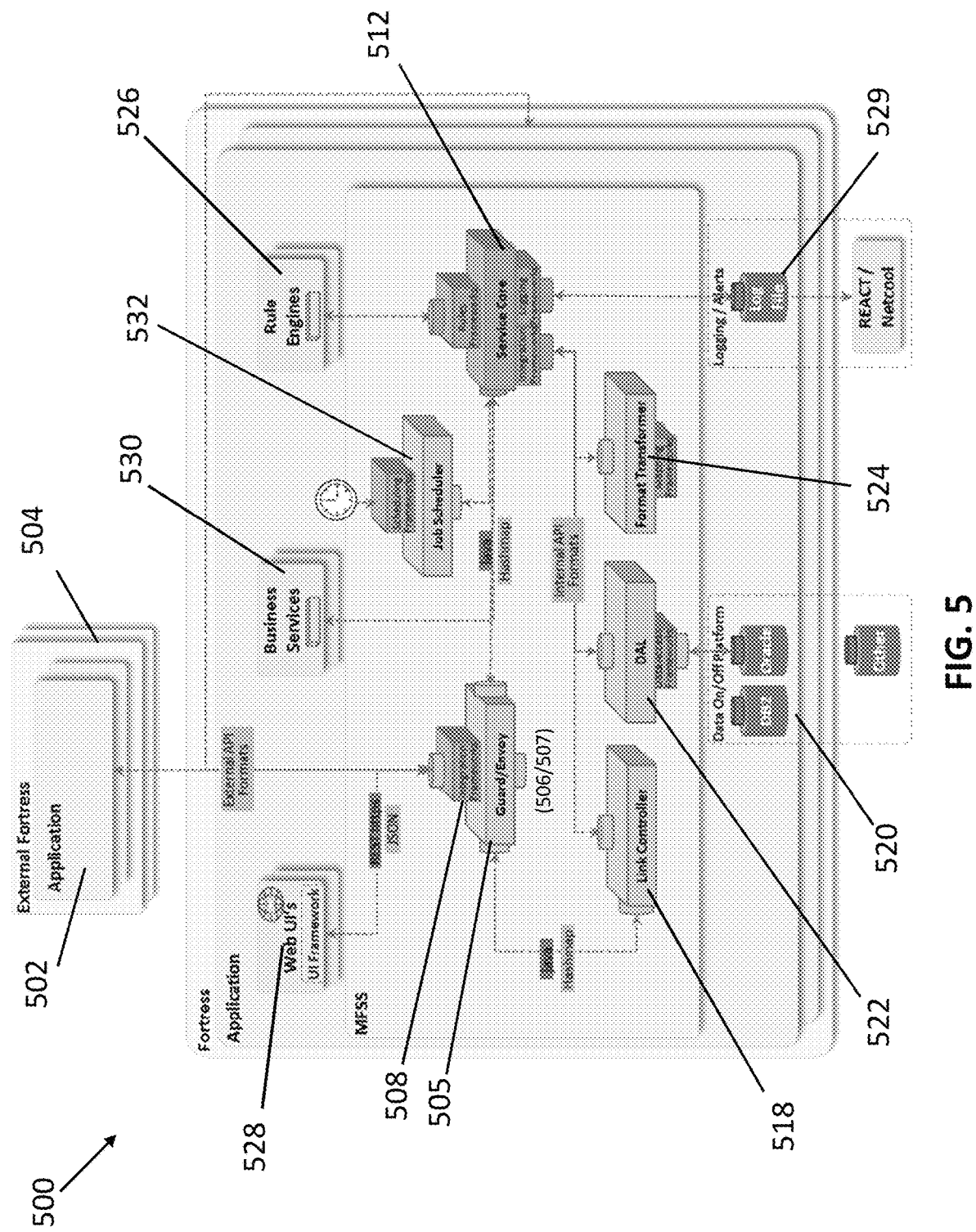
FIG. 5 is a diagram illustrating a system for implementing a multiplatform framework for shared services, according to an exemplary embodiment.

FIG. 5 is a diagram illustrating a system 500 for implementing a multi-platform framework for shared services, according to an exemplary embodiment. System 500 may comprise a guard/envoy module 505, a service core module 512, a format transformer 524, and a data access layer (DAL) 522. System 500 may further comprise, according to at least one exemplary embodiment, a link controller 518 and a job scheduler 532. In at least one exemplary embodiment, the guard/envoy module 505 may be embodied as separate modules and/or submodules, e.g. a guard module 506 and an envoy module 507. It will be appreciated that the various modules of system 500 may be comprise various combinations of computer hardware and software configured to execute the functions described herein. In at least one exemplary embodiment, system 100 may be implemented as a Java-based framework that isolates software from the underlying technical stack components which enables greater portability, reusability, and productivity of system 100 and its various modules.

As shown in FIG. 5, applications 502 may be stored in an external platform/fortress 504, e.g. an application server. Alternatively, applications 502 may be stored in the system 500. Applications 502 may include software applications that are required for executing business tasks, such as, for example, processing payments or modifying customer data. In an exemplary embodiment, a user of the system 500 creates a client application that includes one or more configuration files that drives system processes and client use case flows. In an exemplary embodiment, the process and flows may be activated by a request message that is received or by an internally scheduled time-based event.

The guard/envoy module 505 may be configured to receive application data directly from the application 502 and/or from the external platform 504. The guard/envoy module 505 may be further configured to receive and/or access messages on a queue, read files, and/or handle web services requests. The data received by the guard/envoy module 505 may be configured according to any of various protocols associated with data and/or its source. In an exemplary embodiment, the guard/envoy module 505 may comprise an integration framework 508 that is configured to adapt application data to a standardized form for use with the system 500. The integration framework 508 may adapt/convert/transform data into a standard configuration file, which may "look and feel" the same to an end user, regardless of the format of the data received from the application 102 and/or external store 104. In an exemplary embodiment, the integration framework 108 may convert application data into a JSON format or an XML format.

Figure 6:
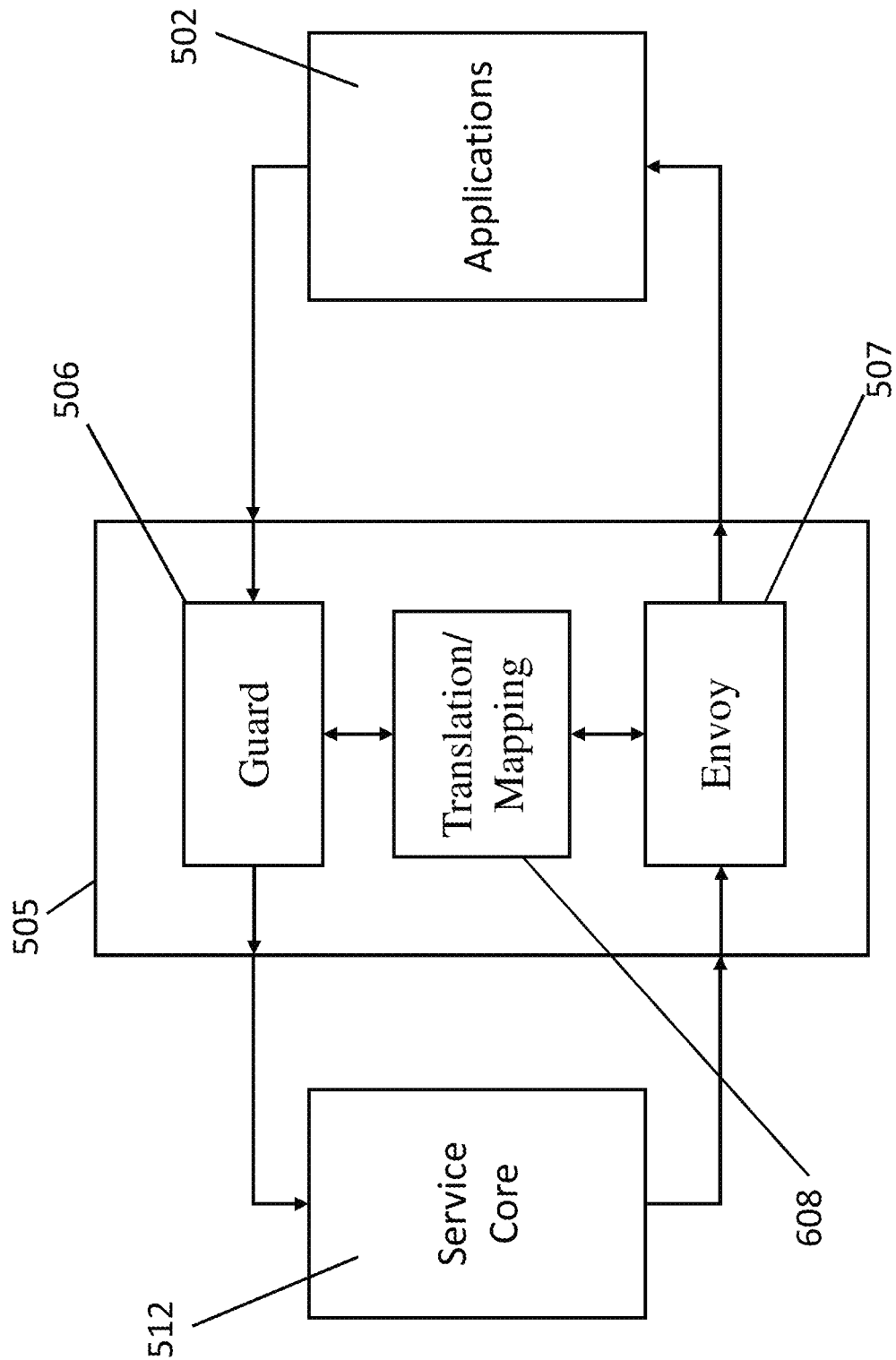
FIG. 6 is a block diagram illustrating a configuration of the system of FIG. 5, according to an exemplary embodiment.

FIG. 6 is a block diagram illustrating a configuration of the system of FIG. 5, according to an exemplary embodiment. As illustrated in FIG. 6, the system configuration includes a guard/envoy module 505 that may comprise a guard module 506 that receives data from applications 502, an envoy module 507 that transmits data to intended destinations, such as other systems and/or other applications 502. The guard/envoy module 505 may be in electronic communication with the service core module 512. In an exemplary embodiment, the service core module 112 handles the common logic and functions across the system 500. Example service core module functions include the lazy-loading and caching of configuration files on demand, logic to execute other modules in the system 500 via the integration framework 508 based on the corresponding logical environment, logging of events with logging frameworks, and common utilities such as string manipulation, calendar utilities, and null checks. A logical environment may enable multiple versions of the same service to co-exist in a single Java virtual machine without impacting each other. In an exemplary embodiment, the service core module 512 is in communication with a rules engine 526 which provides operational rules for the service core module 512.

Referring again to FIG. 5, once the guard/envoy module 505 has received application data from application 502, the data may be passed, mapped, or otherwise transmitted to the service core module 512. The guard/envoy module 505 may be configured to verify certain aspects of the data before transmitting the data to the service core module 512. In an exemplary embodiment, the guard/envoy module 505 may verify entitlement data associated with application data in order to verify the source of the data and whether the data is permitted to be passed throughout system 500. The guard/envoy module 505 may be further configured to communicate with a link controller 518 which provides an application programming interface (API) in order to start and stop links that function as entry and exit points of the system 500. In an exemplary embodiment, the links may include any of queues for receiving and sending messages, web service endpoints, and/or jobs. In an exemplary embodiment, the application data is modified into a different format by the format transformer module 524.

User interfaces are provided by a user interface (UI) framework 528. The UI framework 528 provides user interfaces to the users of applications 502 that are implemented using the system 500. In an exemplary embodiment, the UI framework 528 is a responsive and module Web UI that is configured to simplify the maintenance and deployment of configuration files across one or multiple environments. In an exemplary embodiment, the UI framework 528 integrates with an application 502 to display and/or modify one or more configuration files based on a user request. In an exemplary embodiment, the UI framework 528 does not contain any business logic, but instead includes JavaScripts, React JavaScript modules, and Cascading Style Sheet (CSS) files.

Figure 7:
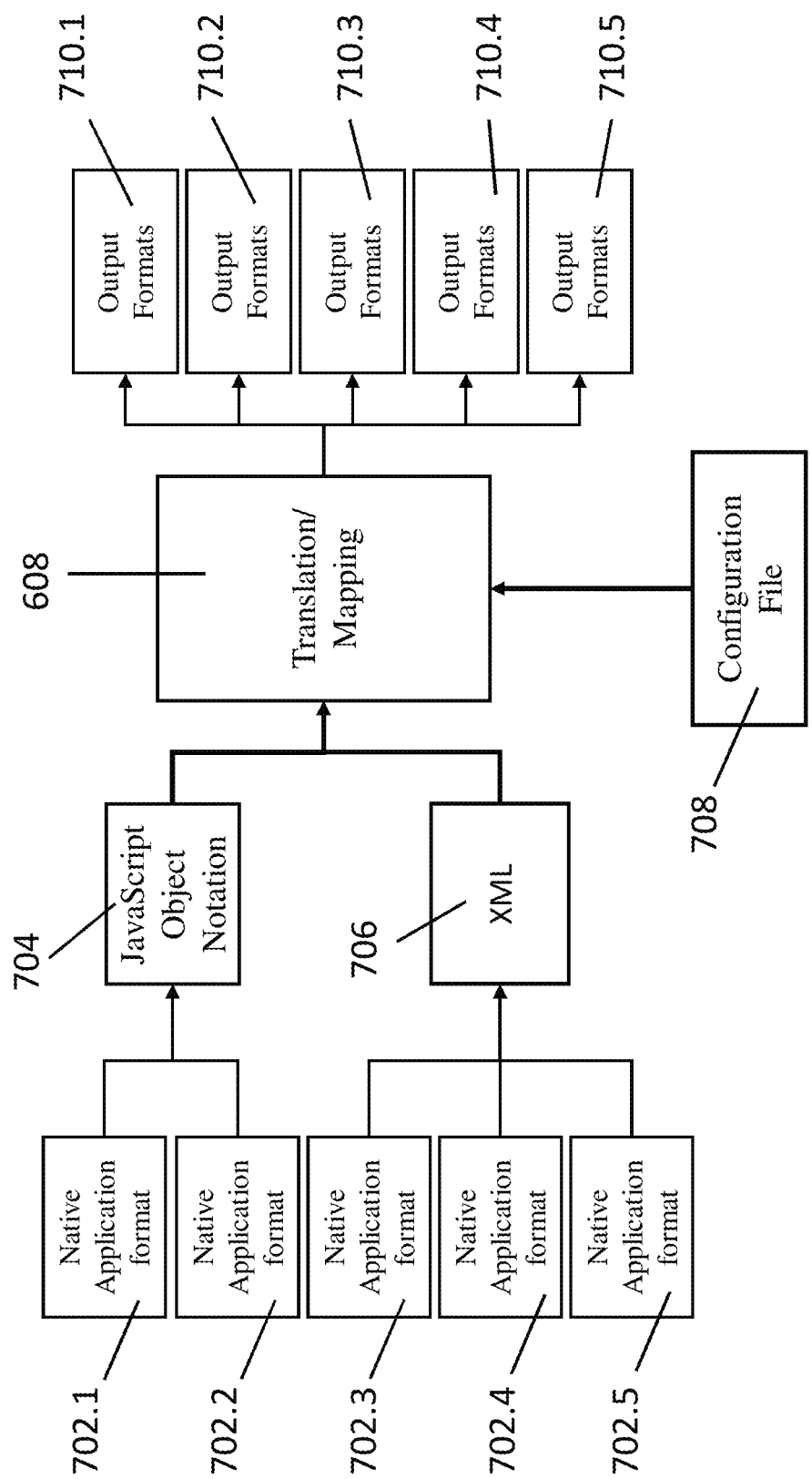
FIG. 7 is a diagram illustrating data flows with respect to a translation/mapping module of the system configuration of FIG. 6.

FIG. 7 is a diagram illustrating data flows with respect to a translation/mapping module 608 of the system configuration of FIG. 6. Referring to FIG. 7, in an exemplary embodiment, translation and mapping of data associated with an application 502 may be performed by the translation/mapping module 608. As illustrated in FIG. 7, data may be received from various applications 702.1, 702.2, 702.3, 702.4, and 702.5, and the data may be in disparate native formats. In an exemplary embodiment, the data may be provided in various formats, such as, but not limited to, JSON 704 and XML 706. These data formats are provided to the translation/mapping module 608. In an exemplary embodiment, the translation and mapping functions are executed based on data contained in a configuration file 708. The translation and mapping module 608 then translates the data as needed and maps the data to the proper location in a data file. The results of the translation and mapping functions are illustrated by the various output formats 710.1, 710.2, 710.3, 710.4, and 710.5.

Figure 8:
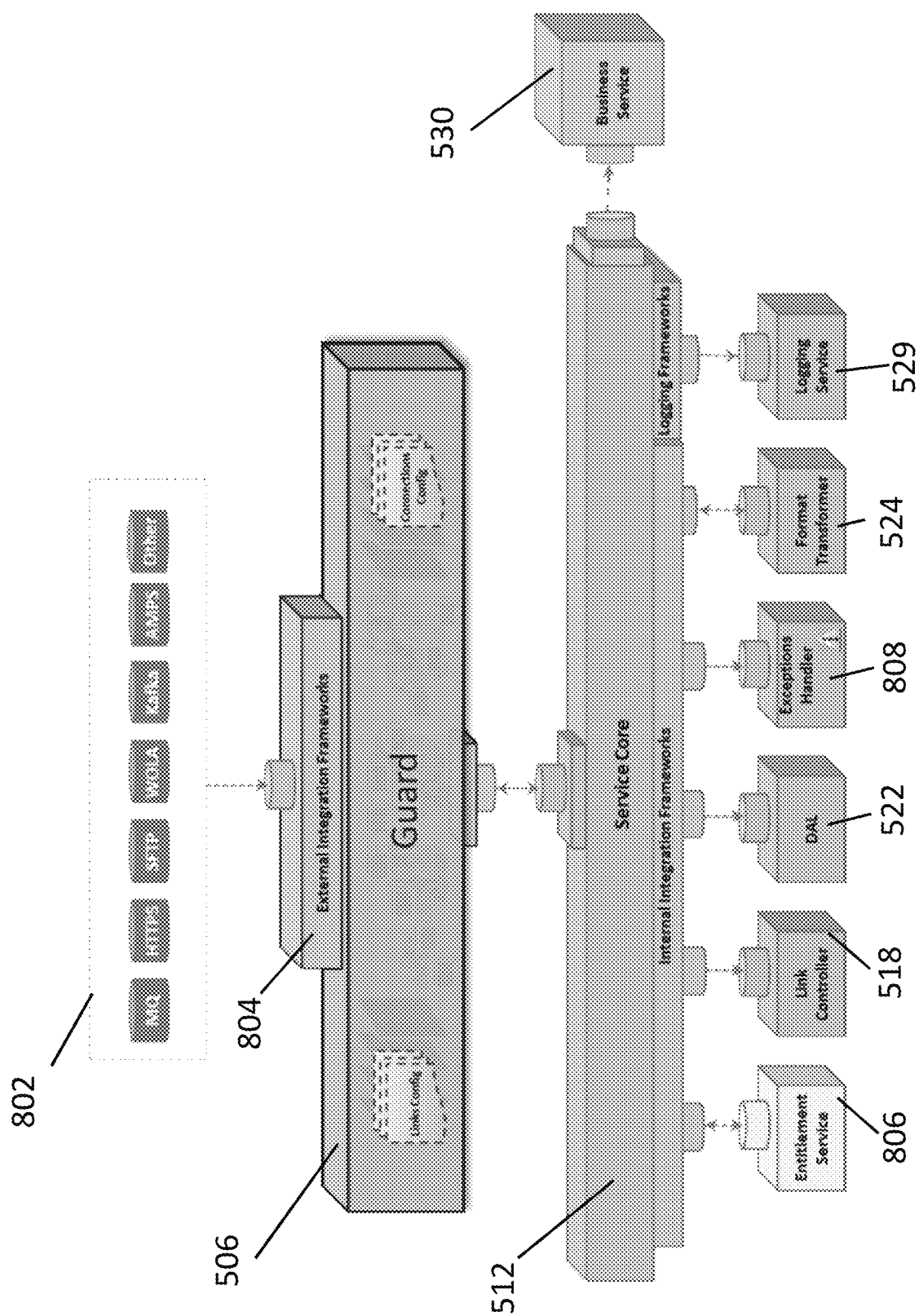
FIG. 8 is a diagram illustrating the guard module of the system of FIGS. 5 and 6.

FIG. 8 is a diagram illustrating the guard module 506 of the system of FIGS. 5 and 6. In an exemplary embodiment, the guard module 506 is be configured to receive data from one or more applications 802. Because the applications 802 may originate from diverse providers, the data that is provided may be in any number of different formats. External integration frameworks 804 may be utilized to receive the data in the formats provided by the applications 802. In an exemplary embodiment, the external integration frameworks 804 may be associated with external repositories and/or libraries (e.g., open source and commercial) that are sourced from internal repositories. These external libraries may facilitate connections with various protocols, such as, for example, IBM MQ, HTTPS, WOLA, Kafka, AMPS, and/or UI Framework, which are associated with the applications 802. The guard module 506 may function as a gatekeeper of the application data provided to the system 500. In an exemplary embodiment, the guard module 506 is configured to consume messages from a queue, read files, and/or handle web service requests. The consumption, reading, and handling functions may be performed by middleware adapters which may be included in the external integration frameworks 804, which effectively shield the core logic from low-level calls and communication protocols. When operating, the guard module 506 may check incoming messages or requests from the applications 802 for appropriate entitlements, extract the raw data from the message or request, and map key data points to a standard canonical object via the format transformer module 524. In an exemplary embodiment, based on a metadata configuration of the data received, the guard module 506 may store raw data into a data store via the data access layer module 522 and forward the standardized data for consumption by other business modules or services. The service core module 512 may be used to facilitate the interaction between the guard module 506 and other modules of the system 500. Exemplary modules comprise an entitlement service module 806, a link controller 518, a data access layer module 522, an exceptions handler 808, a format transformer module 524, and a logging service module 529. The service core module 512 provides translated and standardized application results to the business services module 530.

Figure 9:
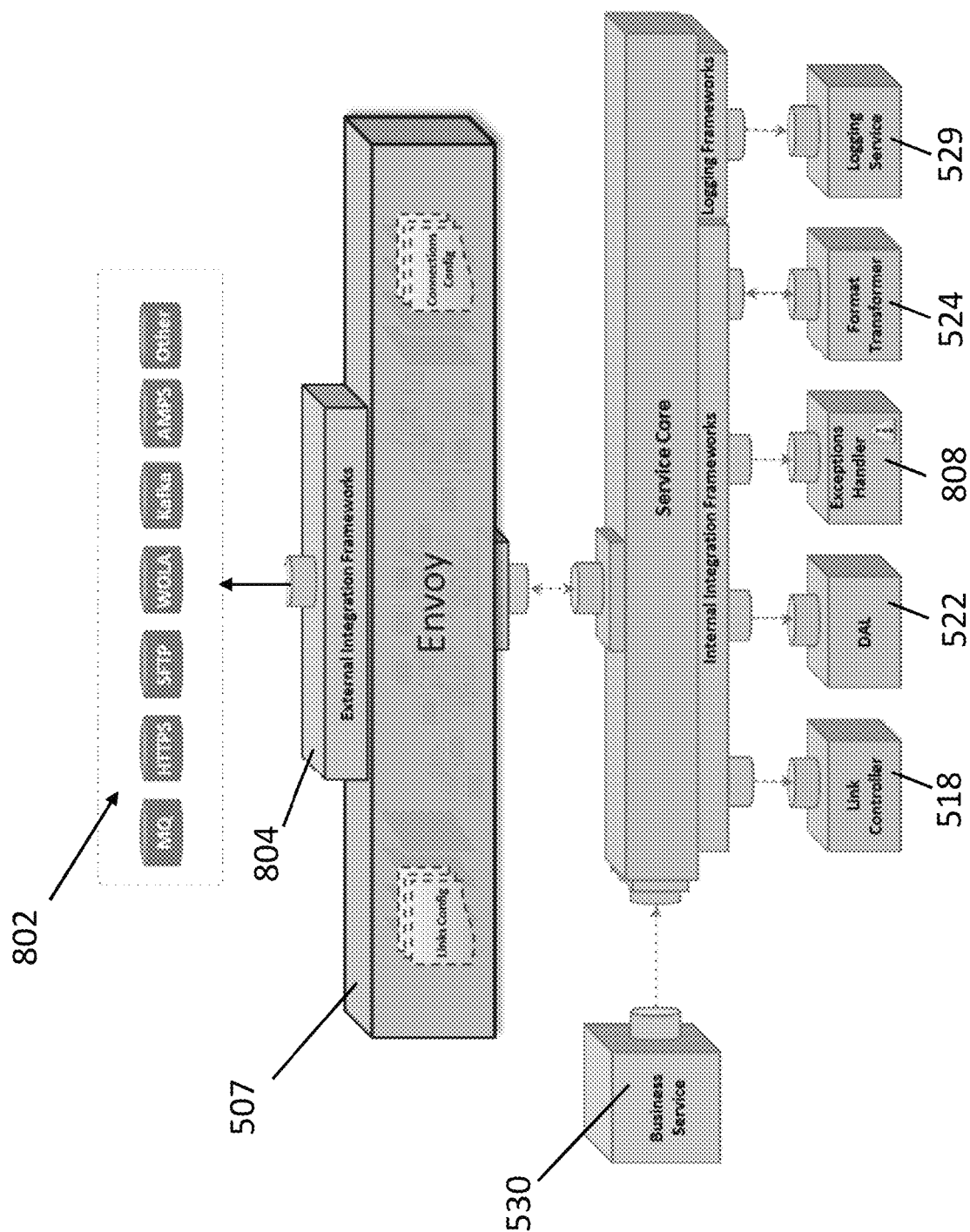
FIG. 9 is a diagram illustrating the envoy module of the system of FIGS. 5 and 6.

FIG. 9 is a diagram illustrating the envoy module of the system of FIGS. 5 and 6. In an exemplary embodiment, the envoy module 507 is configured to send messages to applications 802 using various outbound formats. In an exemplary embodiment, the envoy module 507 is configured to send files and handle web service responses via middleware adapters that shield the core envoy module logic from low-level calls and communication protocols of the applications 802. In an exemplary embodiment, based on metadata included in a configuration file, the envoy module 507 may transfer outbound data into data stores via the data access layer module 522 before sending each message to its intended destination. In an exemplary embodiment, the service core module 512 may be used to facilitate interactions between the envoy module 507 and other modules in the system 500.

Figure 10:
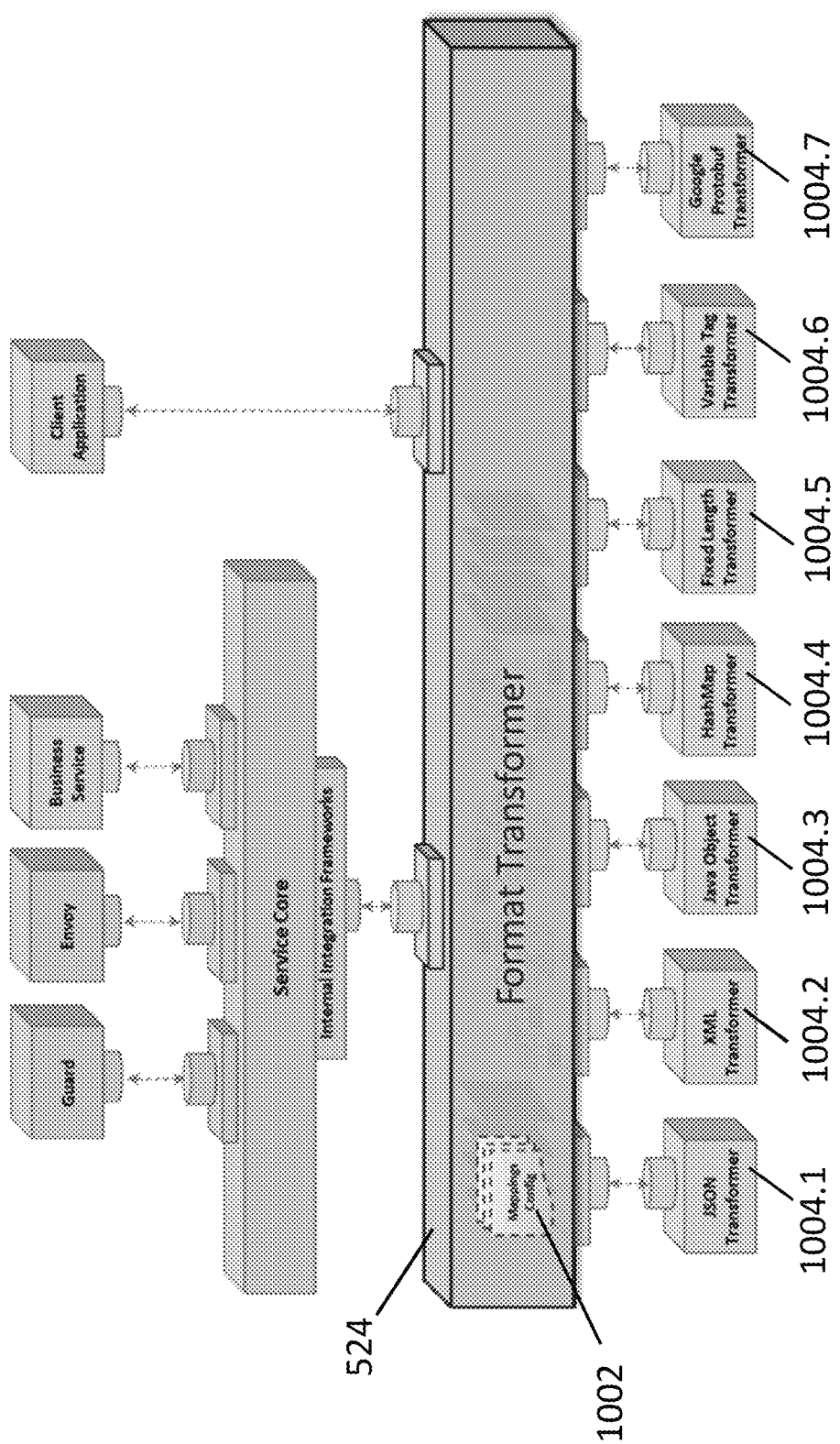
FIG. 10 is a diagram illustrating the format transformer module of the system of FIG. 5.

FIG. 10 is a diagram illustrating the format transformer module 524 of the system of FIG. 5. In an exemplary embodiment, the format transformer module 524 is configured to transform and map data from one format to another based on a mapping configuration 1002 for the source and target format required, as indicated in a configuration file. In an exemplary embodiment, the format transformer module 524 is configured to handle various types of mappings, such as simple mappings (i.e., one to one, one to many, many to many), and complex mappings, and also to add user-based functions for custom mappings. In an exemplary embodiment, the format transformer module 524 is configured to handle various formats, including, but not limited to, XML, Java, JSON, Fixed Length EBCDIC or ASCII, Java HashMaps, Google Protobuf, and/or other suitable formats. As illustrated in FIG. 10, the format transformation is performed by various transformers 1004.1, 1004.2, 1004.3, 1004.4, 1004.5, 1004.6, and 1004.7, which are in communication with the format transformer module 524. In an exemplary embodiment, a transformer (e.g. any one of transformers 1004.1-1004.7) is generated based on the application data, the application, or the data source. In an exemplary embodiment, the format transformer module 524 is configured to operate outside the system 500 as a stand-alone service.

Figure 11:
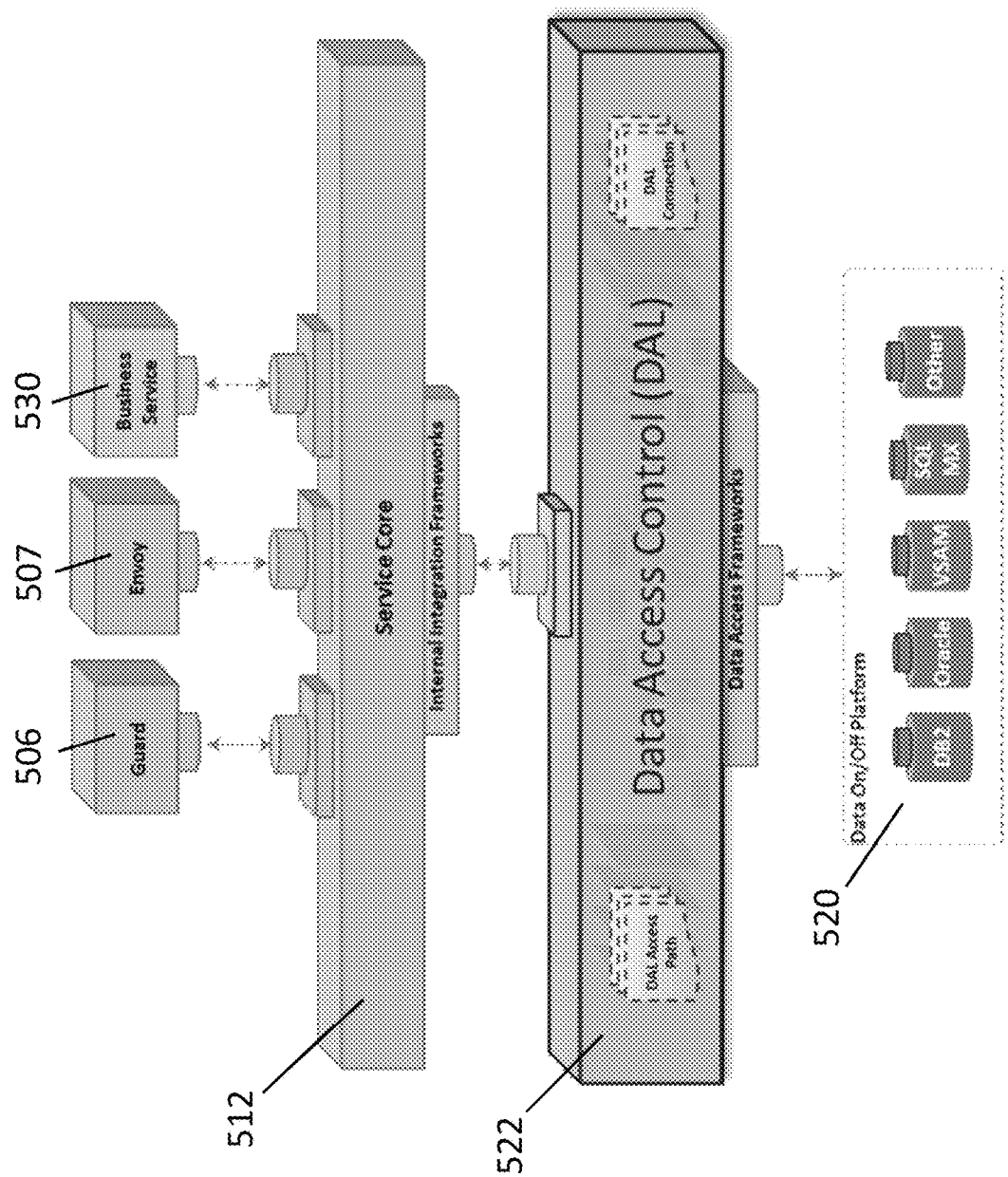
FIG. 11 is a diagram illustrating the data access control module of the system of FIG. 5.

FIG. 11 is a diagram illustrating the data access control module 522 of the system of FIG. 5. Data access control module 522 may also be referred to herein as the data access layer (DAL). In an exemplary embodiment, the data access control module 522 may provide a layer of isolation and an application program interface (API) that may be used for accessing data from different data stores 520 that reside either on-platform or off-platform based on metadata that is included in a configuration file. In an exemplary embodiment, the data access control module 522 is configured to integrate third-party object relational mapping (ORM) frameworks, thus reducing the impact to the business services 530 and core framework modules as databases and ORM frameworks evolve. In an exemplary embodiment, the data access control module 522 is further configured to operate outside the system 500 as a stand-alone service. In an exemplary embodiment, the service core module 512 functions to connect the data access layer module 522 with the guard module 506, the envoy module 507, and business services 530.

Accordingly, with this technology, an optimized process for facilitating integration of applications with distributed platforms and external services in a modular and reusable manner is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for integrating an application with a platform, the method being implemented by at least one processor, the method comprising:
   receiving, from the application, a request message and at least one configuration file;
   verifying, by the at least one processor, the request message based on entitlement data associated with the application;

extracting, from the request message, a first set of raw data;

using information included in the at least one configuration file to transform the extracted raw data into a target format corresponding to the platform;

mapping a subset of the extracted raw data to a predetermined canonical object;

outputting the transformed data to a predetermined destination that is associated with the platform; and lazy-loading the at least one configuration file when a command for loading the configuration file is received from a user.

2. The method of claim 1, wherein the target format includes at least one from among eXtensible Markup Language (XML) format, Java format, Java Script Object Notation (JSON) format, Java HashMaps format, Google Protocol Buffers format, Fixed Length Extended Binary Coded Decimal Interchange Code (EBCDIC) format, and American Standard Code for Information Interchange (ASCII) format.

3. The method of claim 1, wherein the received request message relates to at least one protocol from among a Hypertext Transfer Protocol Secure (HTTPS) protocol, a Web Sphere Optimized Local Adapters (WOLA) protocol, a Kafka protocol, a Secure File Transfer Protocol (SFTP) protocol, and an Advanced Message Processing System (AMPS) protocol.

4. The method of claim 1, further comprising caching the at least one configuration file.

5. The method of claim 1, further comprising using an integration framework component to execute a software module that relates to the application.

6. The method of claim 1, further comprising logging at least one event that occurs during an execution of the method.

7. The method of claim 1, further comprising performing at least one utility function from among a string manipulation function, a calendar utility function, and a null check function.

8. The method of claim 1, wherein the receiving comprises using a communication interface to receive the request message, wherein the communication interface includes an application programming interface (API) that is displayable to a user.

9. The method of claim 8, wherein the outputting comprises using the communication interface to output the transformed data.

10. The method of claim 1, further comprising persisting the extracted raw data into a database.

11. A computing apparatus configured to implement an execution of a method for integrating an application with a platform, the computing apparatus comprising:

a first component that includes a first processor;
a second component that includes a second processor;
a third component that includes a third processor;
a fourth component that includes a fourth processor; and
a memory;

wherein the first processor is configured to:
receive, from the application, a request message and at least one configuration file;

verify the request message based on entitlement data associated with the application;

extract, from the request message, a first set of raw data;

map a subset of the extracted raw data to a predetermined canonical object; and persist the extracted raw data to the memory, wherein the second processor is configured to use information included in the at least one configuration file to transform the extracted raw data into a target format corresponding to the platform, and wherein the third processor is configured to persist the transformed data into the memory and to output the transformed data to a predetermined destination that is associated with the platform, and wherein the fourth processor is configured to lazy-load the at least one configuration file when a command for loading the at least one configuration file is received from a user.

12. The computing apparatus of claim 11, wherein the target format includes at least one from among eXtensible Markup Language (XML) format, Java format, Java Script Object Notation (JSON) format, Java HashMaps format, Google Protocol Buffers format, Fixed Length Extended Binary Coded Decimal Interchange Code (EBCDIC) format, and American Standard Code for Information Interchange (ASCII) format.

13. The computing apparatus of claim 11, wherein the received request message relates to at least one protocol from among a Hypertext Transfer Protocol Secure (HTTPS) protocol, a Web Sphere Optimized Local Adapters (WOLA) protocol, a Kafka protocol, a Secure File Transfer Protocol (SFTP) protocol, and an Advanced Message Processing System (AMPS) protocol.

14. The computing apparatus of claim 11, wherein the fourth processor is further configured to cache the at least one configuration file.

15. The computing apparatus of claim 11, wherein the fourth processor is further configured to use an integration framework component to execute a software module that relates to the application.

16. The computing apparatus of claim 11, wherein the fourth processor is further configured to log at least one event that occurs during an execution of the method.

17. The computing apparatus of claim 11, wherein the fourth processor is further configured to perform at least one utility function from among a string manipulation function, a calendar utility function, and a null check function.

18. The computing apparatus of claim 11, wherein the first processor is further configured to use a communication interface to receive the request message via a data access layer, wherein the communication interface includes an application programming interface (API) that is displayable to a user.

19. The computing apparatus of claim 18, wherein the third processor is further configured to use the communication interface to output the transformed data.

* * * * *